United States Patent [19]
Klun et al.

[11] Patent Number: 6,127,485
[45] Date of Patent: Oct. 3, 2000

[54] HIGH TEMPERATURE-STABLE FLUOROCHEMICALS AS HYDROPHOBIC AND OLEOPHOBIC ADDITIVES TO SYNTHETIC ORGANIC POLYMERS

[75] Inventors: Thomas P. Klun, Lakeland; Alton J. Gasper, Minneapolis; John A. Temperante, St. Paul, all of Minn.

[73] Assignee: 3M Innovative Properties Company, St. Paul, Minn.

[21] Appl. No.: 08/901,363

[22] Filed: Jul. 28, 1997

[51] Int. Cl.⁷ .............. C08F 5/02; C08F 14/18; C08F 27/12; B32B 27/00
[52] U.S. Cl. .............. 525/199; 525/165; 525/178; 525/200; 524/319; 524/462; 442/49; 442/60; 442/98; 428/221; 428/357; 428/364; 428/365; 428/394; 428/395
[58] Field of Search ............... 428/365, 395, 428/364, 357, 394, 411.1, 221; 442/49, 60, 98; 524/462, 319; 525/165, 178, 199, 200

[56] References Cited

U.S. PATENT DOCUMENTS

| | | |
|---|---|---|
| 2,803,656 | 8/1957 | Ahlbrecht et al. ............... 260/556 |
| 2,809,990 | 10/1957 | Brown ............................ 260/534 |
| 3,398,182 | 8/1968 | Guenthner et al. ............... 260/455 |
| 3,923,715 | 12/1975 | Dettre et al. .................. 260/29.6 |
| 4,001,305 | 1/1977 | Dear et al. .................... 260/486 |
| 4,029,585 | 6/1977 | Dettre et al. .................. 252/8.6 |
| 4,215,205 | 7/1980 | Landucci ....................... 525/331 |
| 4,264,484 | 4/1981 | Patel ........................... 260/29.6 |
| 4,426,466 | 1/1984 | Schwartz ....................... 523/455 |
| 4,539,006 | 9/1985 | Langford ....................... 8/94.1 |
| 4,566,981 | 1/1986 | Howells ........................ 252/8.8 |
| 4,606,737 | 8/1986 | Stern ........................... 8/115.6 |
| 4,668,406 | 5/1987 | Chang .......................... 252/8.75 |
| 4,792,354 | 12/1988 | Matsuo et al. .................. 106/2 |
| 5,025,052 | 6/1991 | Crater et al. ................... 524/104 |
| 5,143,963 | 9/1992 | Sterling et al. ................. 524/366 |
| 5,145,727 | 9/1992 | Potts et al. .................... 428/198 |
| 5,149,576 | 9/1992 | Potts et al. .................... 428/198 |
| 5,300,357 | 4/1994 | Gardiner ....................... 428/224 |
| 5,300,587 | 4/1994 | Mascia et al. .................. 525/359.3 |
| 5,336,717 | 8/1994 | Rolando et al. ................. 525/64 |
| 5,380,778 | 1/1995 | Buckanin ....................... 524/247 |
| 5,410,073 | 4/1995 | Kirchner ....................... 560/357 |
| 5,411,576 | 5/1995 | Jones et al. ................... 95/57 |
| 5,451,622 | 9/1995 | Boardman et al. ................ 524/100 |
| 5,459,188 | 10/1995 | Sargent et al. ................. 524/319 |
| 5,560,992 | 10/1996 | Sargent et al. ................. 428/395 |
| 5,589,258 | 12/1996 | Maddern et al. ................. 428/286 |
| 5,898,046 | 4/1999 | Raiford et al. ................. 524/316 |
| 5,981,614 | 11/1999 | Adiletta ....................... 521/145 |

FOREIGN PATENT DOCUMENTS

| | | |
|---|---|---|
| 3-41160 | 2/1991 | Japan . |
| 9-323956 | 12/1997 | Japan . |
| WO 93/10085 | 5/1993 | WIPO . |
| WO 97/22576 | 6/1997 | WIPO . |
| WO 97/22659 | 6/1997 | WIPO . |
| WO 97/22660 | 6/1997 | WIPO . |

OTHER PUBLICATIONS

Mason Hayek, *Waterproofing and Water/Oil Repellency*, 24, Kirk–Othmer Encyclopedia of Chemical Technology, pp. 448–455 (3rd ed. 1979).

Banks, Ed., *Organofluorine Chemicals and Their Industrial Applications*, Ellis Horwood Ltd., Chichester, England, pp. 226–234 (1979).

Wente, *Superfine Thermoplastic Fibers*, 48 Indus. Eng'g Chem. 1342 May, 1954.

Wente et al., Manufacture of Superfine Organic Fibers, Naval Research Laboratories Report No. 4364 (1954).

*Primary Examiner*—P. Hampton-Hightower
*Attorney, Agent, or Firm*—Lucy C. Weiss

[57] ABSTRACT

This invention describes hydrophobic and oleophobic fibers, films and molded articles comprising synthetic organic polymer wherein dispersed within the fiber, fabric or molded article and present at the surface of the fiber, fabric or molded article are fluorochemical compounds. Method of preparing such fibers, films and molded articles, as well as articles made therefrom also are disclosed.

21 Claims, No Drawings

HIGH TEMPERATURE-STABLE FLUOROCHEMICALS AS HYDROPHOBIC AND OLEOPHOBIC ADDITIVES TO SYNTHETIC ORGANIC POLYMERS

FIELD OF THE INVENTION

This invention relates to fiber, film and molded article compositions comprising hydrophobic and oleophobic synthetic organic polymer. In another aspect, the present invention relates to methods for preparing hydrophobic and oleophobic fiber, film and molded articles from synthetic organic polymer. In yet another aspect, the present invention relates to fabrics comprising hydrophobic and oleophobic synthetic organic fiber and to methods of making such fabrics.

BACKGROUND OF THE INVENTION

Synthetic organic polymers, especially polyolefins, are employed widely to create a variety of products. Included among such varied products are: blown and cascade films, extruded sheets, foams, fibers, products made from foam and fibers, woven and knitted fabrics, non-woven fibrous webs and molded articles. Many polymers used in these products, such as polypropylene, exhibit some hydrophobicity (i.e., water resistance), but exhibit no oleophobicity (i.e., oil resistance).

The use of various fluorochemicals to treat topically a variety of fibers and fibrous substrates, such as textiles, carpet, leather, paper and non-woven webs, to impart to those materials desired properties not indigent to the virgin materials, is known. See, for example, Mason Hayek, *Waterproofing and Water/Oil Repellency,* 24, Kirk-Othmer Encyclopedia of Chemical Technology, pp. 448–455 (3rd ed. 1979) or Banks, Ed., *Organofluorine Chemicals and Their Industrial Applications*, Ellis Horwood Ltd., Chichester, England, pp. 226–234 (1979). Such fluorochemical compositions include fluorochemical urethane and urea-based oligomers as disclosed in U.S. Pat. No. 3,398,182 (Guenthner et al.), U.S. Pat. No. 4,001,305 (Dear et al.), U.S. Pat. No. 4,215,205 (Landucci), U.S. Pat. No. 4,606,737 (Stern), U.S. Pat. No. 4,668,406 (Chang), U.S. Pat. No. 4,792,354 (Matsuo et al.) and U.S. Pat. No. 5,410,073 (Kirchner), compositions of cationic and non-cationic fluorochemicals as disclosed in U.S. Pat. No. 4,566,981 (Howells); and compositions containing fluorochemical carboxylic acid and epoxidic cationic resin as disclosed in U.S. Pat. No. 4,426,466 (Schwartz). Also known are fluorochemical esters as disclosed by U.S. Pat. Nos. 3,923,715 (Dettre), U.S. Pat. No. 4,029,585 (Dettre), U.S. Pat. No. 4,264,484 (Patel); and, more specifically, fluorochemical esters derived from dimerized unsaturated fatty acids as disclosed by U.S. Pat. No. 4,539,006 (Langford) and World Published Application WO 93/10085 (Coppens et al.). These fluorochemicals can be applied to various fibrous substrates by methods known in the art, including spraying, padding, and finish bath immersion, or can be applied directly to the fiber before the fiber is woven by incorporating the fluorochemical into the fiber spin finish.

Blending fluorochemicals with synthetic organic polymers and melt extruding fibers from the molten blend to produce fibers and fibrous substrates exhibiting hydrophilicity and oleophilicity also is known. U.S. Pat. No. 5,025,052 (Crater et al.) describes fibers, films and molded articles prepared by melt extruding a blend or mixture of (a) fiber- or film-forming synthetic organic polymers and (b) fluorochemical oxazolidinones to produce fibers, films and molded articles having low surface energy, repellency to oil and water, and resistance to soils. U.S. Pat. No. 5,380,778 (Buckanin) describes fibers, films, and shaped articles made by melt extruding a blend of a fluorochemical aminoalcohol and a thermoplastic polymer, such as polypropylene. U.S. Pat. No. 5,451,622 (Boardman et al.) describes shaped articles, such as fibers and films, made by melt extruding mixtures of fluorochemical piperazine compound and thermoplastic synthetic polymer. U.S. Pat. No. 5,411,576 (Jones et al.) describes an oily mist resistant electret filter media comprising melt blown electret microfibers and a melt processable fluorochemical having a melting point of at least about 25° C. and a molecular weight of about 500 to 2500, the fluorochemical preferably being a fluorochemical oxazolidinone, fluorochemical piperazine or a perfluorinated alkane having from 15 to 50 carbon atoms. U.S. Pat. No. 5,300,587 (Mascia et al.) describes oil-repellent polymeric compositions made by blending a perfluoropolyether and optionally a radical starter with a thermoplastic polymer, intimately mixing the resulting composition at high temperature for sufficient time to form macroradicals from the polymer, and cooling the final composition to room temperature. U.S. Pat. No. 5,336,717 (Rolando et al.) discloses fluorochemical graft copolymers derived from reacting monomers having terminal olefinic double bonds with fluorochemical olefins having fluoroaliphatic groups and polymerizable double bonds.

While these various fluorochemical melt additives can in some circumstances impart satisfactory hydrophobicity and/or oleophobicity to thermoplastic resins, they typically suffer poor thermal stability above 300° C., a melt processing temperature often encountered in the industry, and they also can be prohibitively expensive, lending self-evident limitation to their commercial utility.

SUMMARY OF THE INVENTION

Briefly, in one aspect, this invention describes hydrophobic and oleophobic fibers, fabrics, films and molded articles (including combinations thereof) comprising synthetic organic polymer wherein dispersed within the fiber, film, fabric or molded article and present at the surface of the fiber, fabric, film or molded article are fluorochemical compounds. The fluorochemical compounds so dispersed generally are those that can be depicted either by Formula I, Formula II, Formula III or Formula IV below:

  (I)

  (II)

  (III)

  (IV)

wherein:

$R_f$ is a fluorinated, preferably perfluorinated, alkyl group bonded through carbon;

n is 1 or 2;

Q is a divalent or trivalent linking group, where the divalent linking group can be simply a covalent bond;

p is 1, 2 or many, up to the valency of A or A';

R is a hydrogen atom or is a substituted or unsubstituted alkyl group, preferably an alkyl group having from 1 to 6 carbon atoms;

A is the residue of a mono- or polyfunctional carboxylic acid; and

A' is the residue of a mono- or polyfunctional alcohol or amine with the proviso that A or A' contain at least 34, or alternatively at least 36, carbon atoms when Q is —CH$_2$CH$_2$—.

The above-depicted fluorochemicals and those compositions containing them impart hydrophobicity and oleophobicity to synthetic organic polymers when blended as melt additives with such polymers prior to their thermal extrusion. These fluorochemicals and fluorochemical compositions also offer the additional benefits of thermal stability above 300° C. and yield lower material cost compared to currently employed fluorochemical polymer additives.

In another aspect, the present invention relates to methods of preparing hydrophobic and oleophobic fibers, films, and molded articles from synthetic organic polymers containing the described fluorochemicals.

In yet another aspect, the present invention relates to fabrics comprising hydrophobic and oleophobic synthetic organic fiber, useful, for example, in medical fabrics and apparel, and filter media. Methods for making such fibers also is disclosed.

DETAILED DESCRIPTION OF THE INVENTION

Those fluorochemicals preferred in the practice of the invention are selected from the group of compounds that can be depicted generally by the formulas presented below:

  (I)

  (II)

  (III)

  (IV)

wherein:

R$_f$ is a fluorinated, preferably perfluorinated, alkyl group bonded through carbon that may be substituted or unsubstituted, cyclic or acyclic, linear or branched (or any combination thereof) that optionally may contain one or more catenary heteroatoms such as nitrogen, sulfur, or oxygen; the terminal portion of Rf preferably is a fully-fluorinated terminal group containing at least 7 fluorine atoms (e.g., CF$_3$CF$_2$CF$_2$—, (CF$_3$)$_2$CF— or SF$_5$CF$_2$—); R$_f$ may contain one or more hydrogen atoms or one or more other halogen atoms (e.g. chlorine) provided that at least 75%, and preferably at least 90%, of the atoms attached to the carbon backbone are fluorine atoms;

n is 1 or 2;

Q is a divalent or a trivalent linking group (that can be a covalent bond where Q is divalent) or can be an organic moiety containing from 1 to about 20 atoms and that optionally can contain oxygen-, nitrogen- or sulfur-containing groups or any combination thereof, and is preferably free from active hydrogen atoms; preferably, Q is —SO$_2$N(R')(CH$_2$)$_k$—, —(CH$_2$)$_k$—, —CON(R')(CH$_2$)$_k$— or —(CH$_2$)$_k$SO$_2$N(R')(CH$_2$)$_k$—, where R' is hydrogen, a phenyl group or is a short chain substituted or unsubstituted alkyl group, preferably a methyl or ethyl group and where each k is independently an integer from 1 to about 20;

p is equal to 1, 2 or many, up to the valency of A or A';

R is a hydrogen atom or is a substituted or unsubstituted alkyl group, preferably an alkyl group having from 1 to 6 carbon atoms;

A is the residue of a dimer or trimer acid, representing an aliphatic moiety containing from 30 to 170 carbon atoms; and A' is the residue of a mono- or polyfunctional alcohol or amine representing an aliphatic moiety containing from 30 to 170 carbon atoms with the proviso that A or A' contain at least 34 carbon atoms when Q is —CH$_2$CH$_2$—.

It will be understood that, as the necessary result of the manner in which the above-depicted compounds are made, the fluorochemicals actually employed in the practice of the invention typically will be mixtures of compounds having varying numbers of fluorochemical tails. The compounds preferably are made such that the number of these fluorochemical tails (the bracketed groups of the above formulas) for each compound will nearly equal the valency of the mono- or polyfunctional acid or alcohol utilized in its preparation (i.e., more than about 75% of the available valencies of the acid or alcohol will be filled by the fluorochemical tails). Where a polyfunctional acid or alcohol is used, there can, however, be a residuum of unreacted sites on that acid or alcohol for at least a portion of the compounds. Such mixtures are useful in practice of the invention, and are considered within the scope hereof.

Unless otherwise indicated herein, the terms "dimer acid" and "trimer acid" are used herein in their common usage to mean polymerized unsaturated fatty acid products of relatively high molecular weight made up of mixtures comprising various ratios of a variety of large or relatively high molecular weight substituted cyclohexenecarboxylic acids, predominately 36-carbon dibasic acids (dimer acid) and 54-carbon tribasic acids (trimer acid), with no single structure sufficient to characterize each. Component structures may be acyclic, cyclic (monocyclic or bicyclic) or aromatic. Typical component structures present in dimer acids are illustrated below:

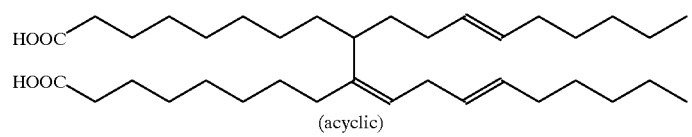

(acyclic)

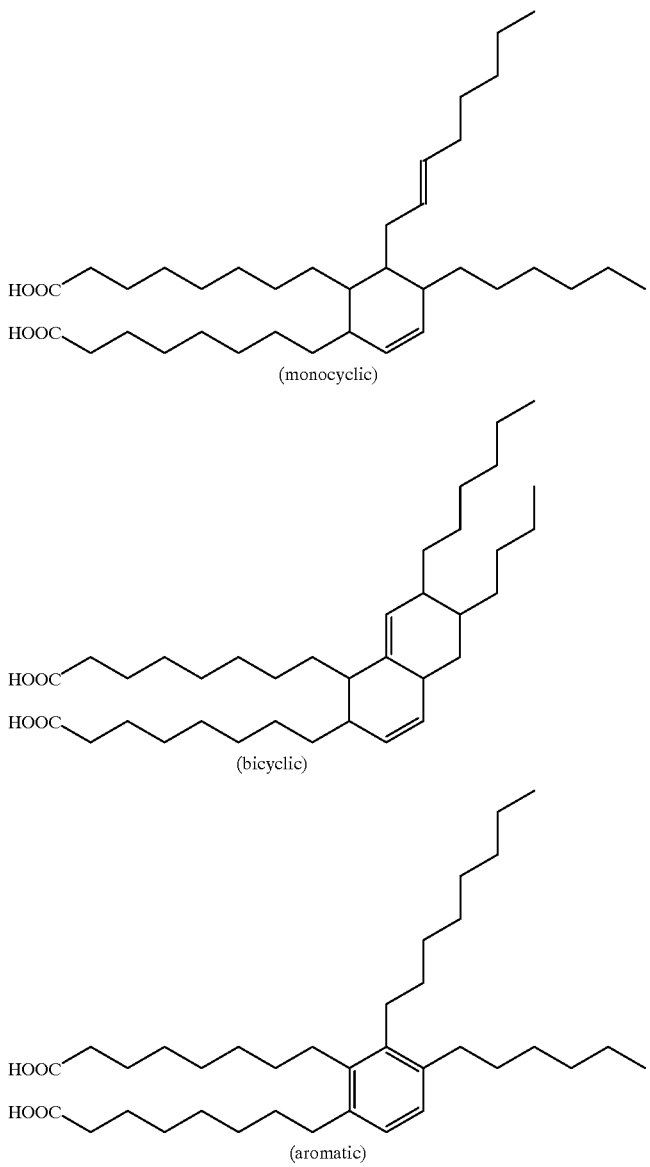
(monocyclic)

(bicyclic)

(aromatic)

Structures for components of trimer acids are similar to those of dimer acids except that they contain an additional carboxylic acid group terminating from another hydrocarbon chain, they contain an additional non-functional hydrocarbon chain, and they contain a greater portion of bicyclic compounds.

Dimer and trimer acids typically are prepared by condensing unsaturated monofunctional carboxylic acids such as oleic, linoleic, soya or tall oil acid through their olefinically unsaturated groups, in the presence of catalysts such as acidic clays. The distribution of the various structures in dimer acids (nominally $C_{36}$ dibasic acids) depends upon the unsaturated acid used in their manufacture. Typically, oleic acid gives a dimer acid containing about 38% acyclics, about 56% mono- and bicyclics, and about 6% aromatics. Soya acid gives a dimer acid containing about 24% acyclics, about 58% mono- and bicyclics and about 18% aromatics. Tall oil acid gives a dimer acid containing about 13% acyclics, about 75% mono- and bicyclics and about 12% aromatics.

Dimer/trimer acids are commercially available from a variety of vendors, including Henkel Corporation/Emery Group (as Empol™ 1008, 1061, 1040 and 1043) and Unichema North America (as Pripol™ 1004 and 1009). For further information concerning these acids, see (1) Leonard, Edward C., "The Dimer Acids," Humko Sheffield Chemical, Memphis, Tennessee, 1975, pp. 1, 4 and 5, and (2) the Kirk-Othmer Encyclopedia of Chemical Technology, John Wiley & Sons, 3rd ed., Vol. 7, 1979, pp. 768–770. Different grades exist for the dimer and trimer acids. Some have been hydrogenated to remove olefinic double bonds and/or distilled for purification.

Dimer diols and diamines can be made from the dimer acid by methods well known in the art. Dimer diols are commercially available from Henkel Corp./Emery Group as Empol™ 1070 and 1075 diols. Dimer amines are commercially available from Witco Corp., for example, as Kemamine™ DP-3695 amine.

Ester compositions of Formula (I) are made conveniently by heating a fluorochemical alcohol with either a dimer acid or a trimer acid in the presence of a standard acid catalyst, such as p-toluenesulfonic acid, preferably in a suitable solvent such as toluene. They also can be prepared by first making an acid chloride of the dimer/trimer acid by reaction with thionyl chloride, and then reacting the acid chloride with a fluorochemical alcohol at a slightly elevated temperature (50–60° C.) in the presence of an acid scavenger, such as pyridine, and preferably in a low-boiling solvent such as chloroform. Suitable fluorochemical alcohols include sulfonamido alcohols such as those described in U.S. Pat. No. 2,803,656 (Ahlbrecht et al.), for example, sulfonamido-based alcohols such as $C_8F_{17}SO_2N(CH_3)CH_2CH_2OH$ and $C_8F_{17}SO_2N(C_2H_5)CH_2CH_2OH$ and telomer-based alcohols such as $C_8F_{17}CH_2CH_2OH$. Suitable dimer and trimer acids include Empol™ 1008, 1061, 1040, and 1043 acids and Pripol™ 1004, 1009 and 1048 acids.

"Reverse" ester compositions of Formula (II) can be prepared by reacting a fluorochemical carboxylic acid with a dimer diol, using the same synthetic procedure as described for the preparation of the ester compositions of Formula (I). Suitable fluorochemical carboxylic acids include sulfonamido carboxylic acids such as those described in U.S. Pat. No. 2,809,990 (Brown et al.), for example, $C_8F_{17}SO_2N(C_2H_5)CH_2COOH$. Suitable dimer diols include Empol™ 1070 and 1075 diols.

Amide compositions of Formula (III) can be prepared by reacting a fluorochemical amine with a dimer or trimer acid by heating the components together neat at an elevated temperature (at least 220° C.). Alternatively, they can be prepared by first making an acid chloride of the dimer/trimer acid by reaction with thionyl chloride, and then reacting the acid chloride with a fluorochemical amine at a slightly elevated temperature (50–60° C.), and preferably in a low-boiling solvent such as chloroform. Suitable fluorochemical amines include $C_8F_{17}SO_2N(C_2H_5)CH_2CH_2NH_2$, $C_8F_{17}SO_2N(C_2H_5)CH_2CH_2NH(CH_3)$ and $C_8F_{17}CH_2CH_2NH_2$. Suitable dimer and trimer acids include Empol™ 1008, 1061, 1040, and 1043 acids and Pripol™ 1004, 1009 and 1048 acids.

"Reverse" amide compositions of Formula (IV) can be prepared by reacting a fluorochemical carboxylic acid with a dimer amine, using the same synthetic procedure as described for the preparation of the ester compositions of Formula (I). Suitable fluorochemical carboxylic acids include sulfonamido carboxylic acids such as those described in U.S. Pat. No. 2,809,990 (Brown et al.), for example, $C_8F_{17}SO_2N(C_2H_5)CH_2COOH$. Suitable dimer amines include Kemamine™ DP-3695 amine.

As used herein, the terms "fiber" and "fibrous" refer to particulate matter, generally thermoplastic resin, wherein the length to diameter ratio of the particulate matter is greater than or equal to about 10. Fiber diameters may range from about 0.5 micron up to at least 1,000 microns. Each fiber may have a variety of cross-sectional geometries, may be solid or hollow, and may be colored by, e.g., incorporating dye or pigment into the polymer melt prior to extrusion. The fluorochemicals and fluorochemical compositions of the invention modify both the surface and the bulk of each fiber in a uniform way. Thus, if some fluorochemical is washed from the surface of the fibers, the fluorochemical reservoir within the fiber supplies more of each surfactant to the surface of the fiber and thus replenishes the fiber's desired properties.

The described fluorochemicals and compositions comprising those fluorochemicals find particular utility as additives to synthetic organic polymers. Synthetic polymeric fibers, films, and molded articles to which the fluorochemicals of the invention have been incorporated, have low surface energy, excellent oil and water repellency, and exhibit a resistance to soiling. Such polymers can be thermoplastic or thermoset including synthetic linear polyamides, e.g., nylon-6 and nylon-66; polyesters, e.g., polyethylene terephthalate; polyolefins, e.g., polyethylene and polypropylene; polyolefin copolymers; epoxy resins; urethanes; acrylics; polystyrenes, etc. The described fluorochemicals also can be used as blends with other fluorochemicals, e.g., with fluorochemical poly (oxyalkylene) compounds oligomers or polymers.

Fibers, films, and molded articles containing the fluorochemicals can be made by preparing a blend of the solid fluorochemical or fluorochemical composition with a chosen solid synthetic polymer by intimately mixing the fluorochemical with pelletized or powdered polymer, and melt extruding the blend into fibers or films by known methods. The fluorochemicals or fluorochemical compositions can be mixed directly with the polymer or they can be mixed with the polymer in the form of a "master batch" (concentrate) of the fluorochemical in the polymer. An organic solution of the fluorochemical or fluorochemical composition may also be mixed with the powdered or pelletized polymer, the mixture dried to remove solvent, then melted and extruded. Alternatively, molten fluorochemicals can be injected into a molten polymer stream to form a blend immediately prior to extrusion into fibers or films.

The amount of fluorochemical used as an additive is that amount sufficient to achieve the desired properties of oil and water repellency and/or soiling resistance. Preferably, the amount of additive to be used will be that amount which provides from about 100 to 20,000 ppm fluorine, more preferably 200 to 10,000 ppm fluorine, based on weight of the fiber or film, in the fiber or film after extrusion.

After melt extrusion of the fiber or film an annealing step can be carried out to enhance surface energy lowering and to enhance oil and water repellency for a particular fluorochemical additive. In addition to or in lieu of such an annealing process, the film or fiber also may be embossed between two heated roll where one or both of the rolls may be patterned. An annealing process typically is conducted below the melt temperature of the synthetic polymer, for example, in the case of nylon, about 150° to 220° C. for a period of about 30 seconds to about 5 minutes. In some cases, the presence of moisture can improve the effectiveness of the fluorochemical.

The fluorochemicals of the invention also can be employed as aqueous suspensions or emulsions, or as organic solvent solutions, in the treatment of textile fibers (or filaments) during their manufacture, e.g., in combination with spin finishes, or in the treatment of porous or fibrous substrates such as textiles, carpets, paper, and leather to impart oil and water repellency and anti-soiling properties thereto. The fibers or filaments as such or in aggregated form, e.g., yarn, toe, web, or roving, or the fabricated textile, e.g., articles such as carpet and woven fabrics, can be treated with the fluorochemical. This treatment can be carried out by applying the fluorochemical or fluorochemical composition as organic solutions or as aqueous organic dispersions by known techniques customarily employed in applying fluorochemicals, e.g., fluorochemical acrylate copolymers, to fibers and fiber substrates. The fluorochemical treatment, for example, with the fluorochemical being in the form of an aqueous emulsion or organic solution, can be carried out by immersing the fiber substrates in a bath containing a cationic, anionic, or nonionic fluorochemical blend, padding the substrate or spraying the same with the fluorochemical emulsion or solution, or by foam, kiss-roll, or metering the applications, e.g., spin finishing, and then drying the treated substrates if solvent is still present. If desired, the fluorochemicals or blends of fluorochemicals can be co-applied with conventional fiber treating agents, e.g., anti-static agents or non-aqueous fiber lubricants.

In addition to the use of the fluorochemicals of this invention in modifying the properties of fibers, e.g., carpet fibers, as described above, they also find utility as blend additives and blown microfibers for use in making non-woven fabrics having low surface energy, oil and water repellency, and/or resistance to soils. Such non-woven webs or fabrics are readily prepared by processes used in the manufacture of either melt-blown or spunbonded webs. For example, a process similar to that described in Wente, *Superfine Thermoplastic Fibers*, 48 INDUS. ENG'G CHEM. 1342 (1956), or in WENTE ET AL., MANUFACTURE OF SUPERFINE ORGANIC FIBERS, (Naval Research Laboratories Report No. 4364, 1954) can be used for the preparation of the nonwoven webs of this invention. Multi-layer constructions made from non-woven fabrics enjoy wide industrial and commercial utility and include uses as medical fabrics. The makeup of the constituent layers of such multi-layer constructions can be varied according to the desired end-use characteristics and can comprise two or more layers of melt-blown and spunbond webs in many useful combinations such as described in U.S. Pat. Nos. 5,145,727 and 5,149,576, both of whose descriptions are incorporated herein by reference.

Any of a wide variety of constructions may be made from the above-described fibers and fabrics, and such constructions will find utility in any application where some level of hydrophobicity, alcohol repellency, or oleophobicity is required. The fibers and fabrics of the invention may, for example, be used in woven and non-woven medical fabrics and related apparel, industrial apparel, outdoor fabrics (e.g., umbrellas, awnings, tents, etc.), raincoats and other outdoor apparel, as well as in home furnishing such as table linens and shower curtains and in myriad other related uses.

Films of the invention can be made from blends of synthetic organic polymer and the described fluorochemicals by any of the film making methods commonly employed in the art. Such films may be non-porous or porous (the latter including films that are mechanically perforated) where the presence and degree of porosity is selected according to desired performance characteristics.

The fluorochemicals of the invention also can find utility as additives to polymer coatings and articles, e.g., to improve water resistance, lower surface energy, improved dielectric properties, etc.

The following examples are offered to aid in the understanding of the present invention and are not to be construed as limiting the scope thereof. Unless otherwise indicated, all parts and percentages are by weight.

TEST METHODS

Melt-Blown Extrusion Procedure—The melt-blown extrusion procedure is the same as described in U.S. Pat. No. 5,300,357, column 10, which is herein incorporated by reference. The extruder used is a Brabender 42 mm conical twin screw extruder, with maximum extrusion temperature of 270–280° C. and distance to the collector of 12 inches (30 cm).

Fluorochemical and thermo plastic polymer mixtures are mixed by blending the fluorochemical and thermoplastic polymer in a paperboard container using a mixer head affixed to a hand drill for about one minute until a visually homogeneous mixture is obtained.

The process condition for each mixture is the same, including the melt blowing die construction used to blow the microfiber web, the basis weight of the web ($50\pm5$ g/m$^2$) and the diameter of the microfibers (5–18 micrometers). Unless otherwise stated, the extrusion temperature is 270–280° C., the primary air temperature is 210° C., the pressure is 124 kPa (18 psi), with a 0.076 cm air gap width, and the polymer throughput rate is about 180 g/hr/cm.

Spunbond Extrusion Procedure—The extruder used is a Reifenhauser Extruder Model Number RT 381 (available from Reifenhauser Co., Troisdorf. Nordrhein Westfalen, Germany). The extruder is driven by an infinitely variable 3φ shunt wound DC motor, 37.3 kW & 2200 rev/min max. The maximum screw speed is reduced to 150 rev/min. The screw is 70 mm in diameter and 2100 mm in length. The entire extruder is 2.3 m in length by 1.3 m in width by 1.6 m in height, weighing 2200 kg. There are five 220 V heating zones at a total of 22.1 kW of heating, power, giving a maximum heating zone temperature of 210° C. The bonder is a Kusters Two-Bowl-Thermobonding-Calender (available from Kusters Corp., Nordrhein Westfalen, Germany). The effective bonding width is 1.2 m. The upper patterned metal roll has a 15% bonding area and a temperature of 270° F. (132° C.), while the lower rubber roll has a slick surface and a temperature of 265° F. (129° C.). The bonding nip pressure is 57–860 pounds force per linear inch (3000–46000 J/cm). The rolls are heated by convection from a continuously circulating furnace oil. The temperature range of the nips is 200–300° F. (93–149° C.). The bonder's speed is directly synchonized to the speed of the collection belt that has a range of 3.6 to 65 linear meters per minute.

The basis weight for the nonwoven web (g/m$^2$) can be calculated by multiplying the speed of the spin pump (rev/m) times the constant 71.

Embossing Procedure—Nonwoven samples were embossed using a top roll with a 15% contact area diamond pattern metal top roll set at 98° C. and a rubber bottom roll set at 104° C., with a gap between the rolls of less than 2 mil (50µ), at a pressure of 30 psi (1550 torr) between the top and bottom rolls, and at a linear speed of 8.3 ft/min (2.5 m/min).

Thermal Gravimetric Analysis (TGA) Test—Unless otherwise stated, the sample is heated from room temperature at a rate of 10° C./min and the percent of the sample left when a given temperature is reached (usually 220° C., 280° C., 320° C. and 340° C.) is reported in most tables. It is desirable to have at least about 90% of the sample remaining after heating to 320° C. so that the fluorochemical is resistant to high temperature processing.

In a variant of this test, a sample of fluorochemical is heated at a rate of 100° C./min to 220° C., 280° C. or 320° C. and held at the respective temperatures. The percent of the sample left after different numbers of minutes is measured and recorded as "% TGA Left."

Water Repellency Test—Nonwoven web samples were evaluated for water repellency using 3M Water Repellency Test V for Floorcoverings (February 1994), available from 3M Company. In this test, samples are challenged to penetrations by blends of deionized water and isopropyl alcohol (IPA). Each blend is assigned a rating number as shown below:

| Water Repellency Rating Number | Blend (% by volume) |
| --- | --- |
| 0 | 100% water |
| 1 | 90/10 water/IPA |

-continued

| Water Repellency Rating Number | Blend (% by volume) |
| --- | --- |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a nonwoven web sample is placed on a flat, horizontal surface. Five small drops of water or a water/IPA mixture are gently placed at points at least two inches apart on the sample. If, after observing for ten seconds at a 45° angle, four of the five drops are visible as a sphere or a hemisphere, the nonwoven web sample is deemed to pass the test. The reported water repellency rating corresponds to the highest numbered water or water/IPA mixture for which the nonwoven sample passes the described test.

It is desirable to have a water repellency rating of at least 4, preferably at least 6.

Oil Repellency Test—Nonwoven web samples were evaluated for oil repellency using 3M Oil Repellency Test III (February 1994), available from 3M Company, St. Paul, Minn. In this test, samples are challenged to penetration by oil or oil mixtures of varying surface tensions. Oils and oil mixtures are given a rating corresponding to the following:

| Repellency Rating Number | Oil Composition |
| --- | --- |
| 0 | (fails Kaydol ™ mineral oil) |
| 1 | Kaydol ™ mineral oil |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the nonwoven web sample passes the test.

It is desirable to have an oil repellency rating of at least 1, preferably at least 3.

GLOSSARY

Thermoplastic Polymers

Escorene™ PP3505 polypropylene—polypropylene, having a 400 melt flow rate, commercially available from Exxon Chemical Company, Baytown, Tex.

Escorene™ PP3445 polypropylene—polypropylene, having a 35 melt flow rate, commercially available from Exxon Chemical Company.

Escorene™ 3795 polypropylene—polypropylene, having an 800 melt flow rate, commercially available from Exxon Chemical Company.

Rexflex FPO™ D-100 polypropylene—polypropylene having a 15 melt flow rate, commercially available from Rexene Corp., Dallas, Tex.

Aspun™ 6806 polyethylene—polyethylene, having a melt index of 105 g/10 min (as measured by Test Method ASTM D-1238) and having a peak melting point of 124.8° C., commercially available from Dow Chemical Co., Midland, Mich.

Duraflex™ polybutylene 8510—polybutylene polymer, having a 45 melt index (as measured by ASTM D1238, Condition D) and having a Brookfield viscosity of 640,000 cps (measured at 177° C. using a #29 spindle), commercially available from Shell Chemical Co., Houston, Tex.

Engage™ 8400 poly(ethylene/octylene)—76/24 ethylene/octene copolymer, having a 30 melt flow rate, commercially available from DuPont/Dow Elastomers, Wilmington, Del.

Exact™ 4023 poly(ethylene/butylene)—ethylene/butylene copolymer, having a 35 melt flow rate, commercially available from Exxon Chemical Company.

Morthane™ PS 400 polyurethane—a thermoplastic polyurethane resin, having a Shore A Hardness (1 sec delay) of 89 and having a melting point range of 140–210° C., commercially available from Shell Chemical Co.

Morthane™ polyester-based polyurethane PS440-200—a polyurethane resin, commercially available from Morton Thiokol Corp., Chicago, Ill.

Celanex™ 2002 polybutylene terephthalate—unfilled polybutylene terephthalate thermoplastic resin, medium flow, commercially available from Hoechst Celanese Corp., Chatham, N.J.

PET 35 BASF polyethylene terephthalate—commercially available from BASF Corp., Mount Olive, N.J.

BASF Ultramid™ B3 nylon—nylon 6 polyamide resin, having a melting point of 220° C., having a number average molecular mass of 15000 and having a melt viscosity of 140 Pa.s at 250° C. (D=1000 s$^{-1}$), commercially available from BASF Corp., Parsippany, N.J.

Raw Materials Used for Synthesis of Fluoroaliphatic Group-Containing Compositions POSF sulfonyl fluoride—$C_8F_{17}SO_2F$, perfluorooctanesulfonyl fluoride, commercially available as Fluorad™ FX-8 fluorochemical intermediate from 3M Company.

MeFOSE alcohol—$C_8F_{17}SO_2N(CH_3)CH_2CH_2OH$, having an equivalent weight of 540, made in two stages by reacting POSF with methylamine and ethylenechlorohydrin, using a procedure similar to that described in Example 1 of U.S. Pat. No. 2,803,656 (Ahlbrecht et al.).

EtFOSE alcohol—$C_8F_{17}SO_2N(C_2H_5)CH_2CH_2OH$, commercially available as Fluorad™ FC-10 fluorochemical alcohol from 3M Company.

FC-129 Acid—$C_8F_{17}SO_2N(C_2H_5)CH_2COOH$— prepared from Fluorad™ FC-129 Fluorochemical Surfactant by acidification with sulfuric acid followed by extraction with isopropyl ether and removal of ether solvent.

Zonyl™ BA alcohol—$F(CF_2CF_2)_nCH_2CH_2OH$, whose average molecular weight is 475, commercially available as from E.I du Pont de Nemours & Co., Wilmington, Del.

Zonyl™ BA(N) alcohol—$F(CF_2CF_2)_nCH_2CH_2OH$, whose average molecular weight is 514, commercially available as from E.I du Pont de Nemours & Co MeFOSG epoxide—

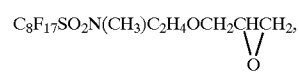

having an epoxy equivalent weight of 640, made in two stages by reacting POSF with methylamine and epichlorohydrin, using a procedure similar to that described in Example 1 of U.S. Pat. No. 5,380,778 (Buckanin).

MeFOS-NH$_2$ amine—C$_8$F$_{17}$SO$_2$N(CH$_3$)CH$_2$CH$_2$NH$_2$, made from MeFOSE, methanesulfonyl chloride and triethylamine to give the intermediate methanesulfonyl chloride ester, followed by treatment with ammonia, using a procedure similar to that described in Examples 1 and 2 of U.S. Pat. No. 3,458,571 (Tokoli).

EtFOS-NH$_2$ amine—C$_8$F$_{17}$SO$_2$N(C$_2$H$_5$)CH$_2$CH$_2$NH$_2$, made from EtFOSE, methanesulfonyl chloride and triethylamine to give the intermediate methanesulfonyl chloride ester, followed by treatment with ammonia, using a procedure similar to that described in Examples 1 and 2 of U.S. Pat. No. 3,458,571 (Tokoli).

EtFOS-NHMe amine—C$_8$F$_{17}$SO$_2$N(C$_2$H$_5$)CH$_2$CH$_2$NH (CH$_3$), made in the same way as MeFOS-NH$_2$, except that methylamine was substituted for ammonia.

EtFOS-NCO isocyanate—C$_8$F$_{17}$SO$_2$N(C$_2$H$_5$) CH$_2$CH$_2$NCO, prepared using the following procedure. To a 3-necked 500 mL flask equipped with overhead stirrer, thermometer and reflux condenser (connected to an empty washing trap which was in turn connected to a gas washing trap containing 20% aqueous NaOH) was charged 100 g (0.169 eq, based on an amine equivalent weight of 590) of C$_8$F$_{17}$SO$_2$(C$_2$H$_5$)HC$_2$H$_4$NH$_2$ (EtFOS-NH$_2$ amine) dissolved in 250 g of ethyl acetate. Through the resulting mixture was bubbled about 7 g (0.192 eq) of hydrogen chloride gas, which produced as slushy mass. Next about 50 g (0.505 eq) of phosgene gas (COCl$_2$) was added over about a 10 minute period, after which the reaction mixture was heated to 55° C. After 3 hours, an additional 36 g (0.364 eq) of phosgene was added and, after reacting overnight, the reaction mixture turned a translucent brown color. An additional 35 g of phosgene was added, but there was no further evidence of reaction. The reaction temperature was raised to 70° C., and excess phosgene and ethyl acetate were removed by distillation. After 1 hour, the reaction mixture was placed under reduced pressure (-90 torr) to remove completely any residual volatiles. The now tan-brown reaction mixture (104 g) was heated to 110° C., causing the mixture to clear up, and the now clear mixture was transferred to a 100 mL round-bottom flask equipped with a 14/20 standard taper joint. The mixture was distilled at 145° C. and 0.1 torr to yield 86.88 g of product which was identified as the desired compound using $^1$H and $^{13}$C NMR spectroscopy, having a molecular weight of 596.

Empol™ 1008 acid—a distilled and hydrogenated dimer acid based on oleic acid, having an acid equivalent weight of 305 as determined by titration, commercially available from Henkel Corp./Emery Group, Cincinnati, Ohio.

Empol™ 1061 acid—a distilled dimer acid based on oleic acid, commercially available from Henkel Corp./Emery Group.

Empol™ 1040 acid—a trimer acid based on oleic acid, commercially available from Henkel Corp./Emery Group.

Empol™ 1043 acid—a trimer acid based on oleic acid, commercially available from Henkel Corp./Emery Group.

Empol™ 1008 acid chloride—prepared using the following procedure. To a 1-L 3-necked round-bottom flask equipped with overhead stirrer, thermometer, addition funnel and reflux condenser (attached to an empty gas washing vessel which in turn was attached to a gas washing vessel containing 25% aqueous NaOH) and placed in an oil bath heated to 65° C. was charged 500 g (1.68 eq, based on an acid equivalent weight of 295) of Empol™ 1008, and 221.8 g (1.86 eq) of thionyl chloride (99% pure, commercially available from Sigma-Aldrich Chemical Co.) was added over a period of about one hour via the addition funnel. The contents in the flask were allowed to react for 72 hours at 65° C. Then the reaction mixture was heated to 100° C. at about 60 torr absolute pressure to remove volatiles. The product, a dark liquid, was characterized as containing the desired product by $^1$H and $^{13}$C NMR spectroscopy and was used without further purification.

Empol™ 1004 acid chloride—prepared using the same procedure as described for Empol™ 1008 dimer acid dichloride except that Empol™ 1004 dimer acid (commercially available from Henkel Corp./Emery Group) was substituted for Empol™ 1008 dimer acid.

Empol™ 1070 diol—a dimer diol based on oleic acid, commercially available from Henkel Corp./Emery Group.

Empol™ 1075 diol—a dimer diol based on oleic acid, having a hydroxyl equivalent weight of 303, commercially available from Henkel Corp./Emery Group.

Pripol™ 1004 acid—a hydrogenated distilled dimer acid based on a C$_{22}$ unsaturated acid, commercially available from Unichema North America, Chicago, Ill.

Pripol™ 1009 acid—a hydrogenated distilled dimer acid based on oleic acid, commercially available from Unichema North America, Chicago, Ill.

Pripol™ 1048 acid—a hydrogenated distilled dimer/ trimer acid based on oleic acid, commercially available from Unichema North America, Chicago, Ill.

Kemamine™ DP-3695 amine—a dimer amine based on oleic acid, having an amine equivalent weight of 290, commercially available from Witco Corp., Newark, N.J.

stearic acid—C$_{17}$H$_{35}$COOH, commercially available from Sigma/Aldrich Chemical Co., Milwaukee, Wis.

stearoyl chloride—C$_{17}$H$_{35}$COCl, prepared by reacting stearic acid with thionyl chloride, having an equivalent weight of 351 as determined by titration.

stearyl alcohol—C$_{17}$H$_{37}$OH, commercially available from Sigma/Aldrich Chemical Co.

stearyl amine—C$_{18}$H$_{37}$NH$_2$, commercially available from Sigma/Aldrich Chemical Co.

stearyl isocyanate—C$_{18}$H$_{37}$NCO, commercially available from Sigma/Aldrich Chemical Co.

succinic anhydride—

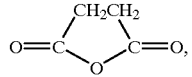

commercially available from Sigma/Aldrich Chemical Co.

ODSA—2-octadecen-1-ylsuccinic anhydride—

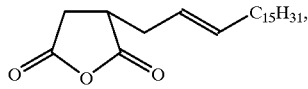

commercially available from Sigma/Aldrich Co.

dodecanoic acid—HOOC(CH$_2$)10COOH, commercially available from E. I. DuPont de Nemours, Wilmington, Del.

adipic acid—HOOC(CH$_2$)$_4$COOH, commercially available from Sigma/Aldrich Chemical Co.

piperazine—

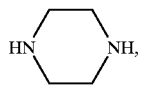

commercially available from Union Carbide Corp., Danbury, Conn.

benzyltriethylammonium chloride—commercially available from Sigma/Aldrich Chemical Co.

butyltin oxide hydroxide hydrate—commercially available from Sigma/Aldrich Chemical Co.

thionyl chloride—commercially available from Sigma/Aldrich Chemical Co.

Synthesis of Fluorochemical Esters

Fluorochemical Ester F-1 was prepared by esterifying MeFOSE alcohol with Empol™ 008 dimer acid at a molar ratio of 2:1 using the following procedure. A 500 mL 2-necked round-bottom flask equipped with overhead condenser, thermometer and Dean-Stark trap wrapped with heat tape was charged with 57.8 g (0.190 eq) of Empol™ 1008 dimer acid, 100 g (0.185 eq) of MeFOSE, 1 g of p-toluenesulfonic acid and 50 g of toluene. The resulting mixture was placed in an oil bath heated to 150° C. The degree of esterification was monitored by measuring the amount of water collected in the Dean-Stark trap and also by using gas chromatography to determine the amount of unreacted fluorochemical alcohol. After 18 hours of reaction, about 2.8 mL of water was collected and a negligible amount of fluorochemical alcohol remained, indicating a complete reaction. The reaction mixture was then cooled to 100° C. and was twice washed with 120 g aliquots of deionized water to a water pH of 3. The final wash was removed from the flask by suction, and the reaction mixture was heated to 120° C. at an absolute pressure of about 90 torr to remove volatiles. The product, a brownish solid, was characterized as containing the desired product by $^1H$ and $^{13}C$ NMR spectroscopy and thermogravimetric analysis.

Fluorochemical Esters F-2 through F-22 were prepared using essentially the same procedure as was used for preparing Fluorochemical Ester F-1, except that the fluorochemical alcohol and carboxylic acid were varied as were their molar ratios.

Fluorochemical Ester F-23, a "reverse" ester made from a fluorochemical carboxylic acid and a dimer alcohol, was prepared using the following procedure.

To a 250 mL 3-necked round bottom flask equipped with overhead stirrer, nitrogen inlet adapter and open vertical tube was charged 60 g (0. 115 eq) of $C_8F_{17}SO_2N(C_2H_5)CH_2COOH$, 34.1 g (0.118 eq) of Empol™ 1070 dimer diol and 0.1 g of butyltin oxide hydroxide hydrate. The reaction was then heated to 170° C. under a gentle nitrogen flow for 4 hours. After this time, analysis of the reaction mixture by $^1H$ and $^{13}C$ NMR showed about 15–17 mole percent unreacted hydroxyl groups, and analysis by gas chromatographic analysis showed some unreacted fluorochemical carboxylic acid. Next, 4 g (estimated 6.7 mole percent) of additional $C_8F_{17}SO_2N(C_2H_5)CH_2COOH$ was added to the reaction mixture, which was heated to 170° C. for an additional 3 hours. GC analysis showed no unreacted fluorochemical carboxylic acid, but NMR analysis showed about 4 mole percent of dimer diol hydroxyl groups left. Then 4 mole percent of $C_8F_{17}SO_2N(C_2H_5)CH_2COOH$ was added to the reaction mixture, which was heated to 170° C. for an additional 4 hours. GC analysis showed no fluorochemical carboxylic acid remained, and NMR analysis showed about only a very small amount of dimer diol hydroxyl groups remaining.

Table 1 shows the various alcohols and acids used to make the esters and their approximate molar ratios.

TABLE 1

| Fluoro-chemical Ester | Alcohol | Carboxylic Acid | Molar Ratio of Alcohol to Acid |
| --- | --- | --- | --- |
| F-1 | MeFOSE | Empol ™ 1008 | 2:1 |
| F-2 | MeFOSE | Empol ™ 1008 | 1:1 |
| F-3 | MeFOSE | Empol ™ 1061 | 2:1 |
| F-4 | MeFOSE | Empol ™ 1061 | 1:1 |
| F-5 | Zonyl ™ BA | Empol ™ 1008 | 2:1 |
| F-6 | Zonyl ™ BA(N) | Empol ™ 1008 | 2:1 |
| F-7 | MeFOSE | Empol ™ 1040 | 3:1 |
| F-8 | MeFOSE | Empol ™ 1043 | 3:1 |
| F-9 | MeFOSE | Pripol ™ 1004 | 2:1 |
| F-10 | Zonyl ™ BA(N) | Pripol ™ 1004 | 2:1 |
| F-11 | MeFOSE | Pripol ™ 1004 | 2:1 |
| F-12 | Zonyl ™ BA(N) | Pripol ™ 1009 | 2:1 |
| F-13 | Zonyl ™ BA(N) | Pripol ™ 1009 | 1:1 |
| F-14 | MeFOSE | Pripol ™ 1048 | 2:1 |
| F-15 | Zonyl ™ BA(N) | Pripol ™ 1048 | 1:1 |
| F-16 | MeFOSE | dodecanoic acid | 2:1 |
| F-17 | MeFOSE | dodecanoic acid | 1:1 |
| F-18 | Zonyl ™ BA(N) | dodecanoic acid | 2:1 |
| F-19 | MeFOSE | adipic acid | 2:1 |
| F-20 | Zonyl ™ BA(N) | adipic acid | 2:1 |
| F-21 | MeFOSE | succinic anhydride | 2:1 |
| F-22 | Zonyl ™ BA(N) | succinic anhydride | 2:1 |
| F-23 | Empol ™ 1070 diol | FC-129 acid | 1:2 |

Fluorochemical Ester F-24 was prepared by esterifying MeFOSE alcohol with Empol™ 1008 dimer acid dichloride at a molar ratio of 2:1 using the following procedure. A 1-L 3-necked round-bottom flask equipped with overhead stirrer, thermometer and oil bath heated to 55° C. was charged with 10 g (0.185 eq) of MeFOSE, 15.6 g (0.197 eq) of pyridine and 95.9 g of chloroform. To this was added 56.5 g (0.180 eq) of Empol™ 1008 dimer acid dichloride over a 20 minute period. After mixing for about one hour in the oil bath, the contents in the flask were allowed to react by heating to 80° C., then were washed first with 150 mL of 2% aqueous $H_2SO_4$, followed by washing with 150 mL of deionized water. The washed reaction mixture was stripped in a rotary evaporator set at 80° C. and about 90 torr to yield 142.8 g of a solid product, characterized by $^1H$ and $^{13}C$ NMR spectroscopy and thermogravimetric analysis to be the desired product.

Fluorochemical Esters F-25 through F-27 were prepared using essentially the same procedure as was used for preparing Fluorochemical Ester F-24, except that the alcohol and acid chloride were varied as were their molar ratios.

Table 2 shows the various alcohols and acid chlorides used to make the esters and their approximate molar ratios.

TABLE 2

| Fluorochemical Ester | Alcohol | Acid Chloride | Molar Ratio of Alcohol to Acid |
| --- | --- | --- | --- |
| F-24 | MeFOSE | Empol ™ 1008 | 2:1 |
| F-25 | MeFOSE | Empol ™ 1004 | 2:1 |
| F-26 | MeFOSE | $C_{17}H_{35}COCl$ | 1:1 |
| F-27 | Zonyl ™ BA | $C_{17}H_{35}COCl$ | 1:1 |

Synthesis of Fluorochemical Ester Alcohols

Fluorochemical Ester Alcohol F-28 was prepared by MeFOSG epoxide with Empol™ 1008 dimer acid at a molar ratio of 2:1 using the following procedure. A 250 mL 3-necked round-bottom flask equipped with overhead stirrer, thermometer and oil bath was charged with 38.4 g (0.15 eq) of Empol™ 1008 dimer acid and 0.42 g of benzyltrimethylammonium chloride, and the contents were heated to a temperature of 96° C. Over a 5 minute period, 83.2 g (0.15 eq) of molten MeFOSG was added via a dropping funnel, lowering the reaction temperature to 80° C. After 16 minutes, the reaction temperature increased to 107° C., then fell to 100° after an additional hour. After 1 hour and 51 minutes, the reaction mixture was clear and homogeneous, and the reaction was allowed to continue for an additional 68 hours. After this time, analysis using gas chromatography showed no residual epoxide, and the product was characterized by $^1$H and $^{13}$C NMR and thermogravimetric analysis to be the desired product.

Fluorochemical Ester Alcohols F-29 through F-31 were prepared using essentially the same procedure as was used for preparing Fluorochemical Ester Alcohol F-28, except that the carboxylic acid was varied as was the molar ratio of epoxide to carboxylic acid.

Table 3 shows the various epoxides and carboxylic acids used to make the ester alcohols and their approximate molar ratios.

TABLE 3

| Fluorochemical Ester Alcohol | Fluorochemical Epoxide | Carboxylic Acid | Molar Ratio of Epoxide to Acid |
|---|---|---|---|
| F-28 | MeFOSG | Empol ™ 1008 | 2:1 |
| F-29 | MeFOSG | Empol ™ 1061 | 2:1 |
| F-30 | MeFOSG | succinic acid | 2:1 |
| F-31 | MeFOSG | $C_{17}H_{35}COOH$ | 1:1 |

Synthesis of Fluorochemical Ether Alcohols

Fluorochemical Ether Alcohol F-32 was prepared by reacting MeFOSG epoxide with Empol™ 1075 dimer alcohol at a molar ratio of 2:1 using the following procedure. A 500 mL 2-necked round-bottom flask equipped with overhead stirrer and 70° C. oil bath was charged with 49.3 (0.163 eq) of Empol™ 1075 dimer alcohol and 0.612 g (0.53 mL) of boron trifluoride etherate, and 100 g (0.156 eq) of molten MeFOSG was added dropwise via an addition funnel. The reaction mixture was allowed to react for a 5 hour period, after which time analysis using gas chromatography showed no residual epoxide. The resulting material, which solidified upon standing, was characterized by $^1$H and $^{13}$C NMR and thermogravimetric analysis to be the desired product.

Fluorochemical Ether Alcohol F-33 was prepared using essentially the same procedure as was used for preparing Fluorochemical Ether Alcohol F-32, except that stearyl alcohol was used instead of Empol™ 1075 dimer alcohol and the molar ratio of epoxide to alcohol was 1:1 rather than 2:1.

Table 4 shows the epoxides and alcohols used to make the ether alcohols and their approximate molar ratios.

TABLE 4

| Fluorochemical Ether Alcohols | Epoxide | Alcohol | Molar Ratio of Epoxide to Alcohol |
|---|---|---|---|
| F-32 | MeFOSG | Empol ™ 1075 | 2:1 |
| F-33 | MeFOSG | $C_{18}H_{37}OH$ | 1:1 |

Synthesis of Fluorochemical Amino Alcohols

Fluorochemical Amino Alcohol F-34 was prepared by reacting MeFOSG epoxide with Kemamine™ DP-3695 dimer amine at a molar ratio of 2:1 using the following procedure. A 250 mL 2-necked round-bottom flask equipped with overhead stirrer and 80° C. oil bath was charged with 45.0 (0.155 eq) of Kemamine™ DP-3695 dimer amine and 0.42 g (0.37 mL) of boron trifluoride etherate, and 95 g (0.148 eq) of MeFOSG was added dropwise via an addition funnel over about a 20 minute period. After reacting for a 5 hour 20 minute period, the reaction mixture showed no residual epoxide from analysis using gas chromatography. $^1$H and $^{13}$C NMR and thermogravimetric analysis showed the resulting solid to be the desired product.

Fluorochemical Amino Alcohols F-35 and F-36 were prepared using essentially the same procedure as was used for preparing Fluorochemical Amino Alcohol F-34, except that stearyl amine was used instead of Kemamine™ DP-3695 dimer amine and the molar ratio of epoxide to amine was 2:1 and 1:1 respectively.

Table 5 shows the various epoxides and amines used to make the amino alcohols and their approximate molar ratios.

TABLE 5

| Fluorochemical Amino Alcohol | Epoxide | Amine | Molar Ratio of Epoxide to Amine |
|---|---|---|---|
| F-34 | MeFOSG | Kemamine ™ DP-3695 | 2:1 |
| F-35 | MeFOSG | $C_{18}H_{37}NH_2$ | 2:1 |
| F-36 | MeFOSG | $C_{18}H_{37}NH_2$ | 1:1 |

Synthesis of Fluorochemical Urethanes

Fluorochemical Urethane F-37 was prepared by reacting EtFOS-NCO isocyanate with Empol™ 1075 dimer alcohol at a molar ratio of 2:1 using the following procedure. A 500 mL 3-necked round-bottom flask equipped with overhead stirrer and 65° C. oil bath was charged with 50.0 g (0.165 eq) of Empol™ 1075 dimer alcohol and 2 drops of dibutyltin dilaurate, and 98.3 g (0.165 eq) of molten EtFOS-NCO was added dropwise via an addition funnel. The reaction mixture, at first whitish in color, cleared and thickened after reacting for 1.5 hours. After 3.5 hours, infrared analysis at 2265 cm$^{-1}$ showed no remaining isocyanate. The resulting solid was found to be the desired product by $^1$H and $^{13}$C NMR and thermogravimetric analysis.

Fluorochemical Urethane F-38 was prepared using essentially the same procedure as described for preparing Fluorochemical Urethane F-37, except that a 1:1 mole ratio of isocyanate to alcohol was used.

Fluorochemical Urethane F-39 was prepared using essentially the same procedure as described for preparing Fluorochemical Urethane F-38, except that stearyl alcohol was used instead of Empol™ 1075 dimer alcohol.

Fluorochemical Urethane F-40, a "reverse" urethane, was prepared by reacting EtFOSE alcohol with stearyl isocyanate at a molar ratio of 1:1 using essentially the same procedure as described for preparing Fluorochemical Urethane F-37.

Table 6 shows the various isocyanates and alcohols used to make the urethanes and their approximate molar ratios.

TABLE 6

| Fluorochemical Urethane | Isocyanate | Alcohol | Molar Ratio of Isocyanate to Alcohol |
|---|---|---|---|
| F-37 | EtFOS—NCO | Empol ™ 1075 | 2:1 |
| F-38 | EtFOS—NCO | Empol ™ 1075 | 1:1 |
| F-39 | EtFOS—NCO | $C_{18}H_{37}OH$ | 1:1 |
| F-40 | $C_{18}H_{37}NCO$ | EtFOSE | 1:1 |

Synthesis of Fluorochemical Ureas

Fluorochemical Urea F-41 was prepared by reacting EtFOS-NCO isocyanate with Kemamine™ DP-3695 dimer amine at a molar ratio of 2:1 using the following procedure. A 250 mL 3-necked round-bottom flask equipped with overhead stirrer, thermometer and 100° C. oil bath was charged with 29.0 g (0.10 eq) of Kemamine DP-3695™ 1075 dimer amine, and 57.2 g (0.096 eq) of molten EtFOS-NCO was added in one portion. The reaction mixture was stirred overnight at 100° C., after which infrared analysis at 2265 cm$^{-1}$ showed no remaining isocyanate. The resulting solid was found to be the desired product by $^1$H and $^{13}$C NMR and thermogravimetric analysis.

Fluorochemical Urea F-42 was prepared using essentially the same procedure as described for preparing Fluorochemical Urea F-41, except that stearyl amine was substituted for Kemamine™ DP-3695 dimer amine and the molar ratio of isocyanate to amine was 1:1.

Fluorochemical Urea F-43, a "reverse" urea, was prepared by reacting EtFOS-NHMe with stearyl isocyanate at a molar ratio of 1:1 using essentially the same procedure as described for preparing Fluorochemical Urea F-41.

Table 7 shows the various isocyanates and amines used to make the ureas and their approximate molar ratios.

TABLE 7

| Fluorochemical Urea | Isocyanate | Amine | Molar Ratio of Isocyanate to Amine |
| --- | --- | --- | --- |
| F-41 | EtFOS—NCO | Kemamine ™ DP-3695 | 2:1 |
| F-42 | EtFOS—NCO | $C_{18}H_{37}NH_2$ | 1:1 |
| F-43 | $C_{18}H_{37}NCO$ | EtFOS—NHMe | 1:1 |

Synthesis of Fluorochemical Amides

Fluorochemical Amide F-44 was prepared by reacting EtFOS-NH$_2$ amine with Empol™ 1008 dichloride at a molar ratio of 2:1 using the following procedure.

A 500 mL 3-necked round-bottom flask equipped with overhead stirrer, thermometer and 65° C. oil bath was charged with 40.0 g (0.0642 eq) of EtFOS-NH$_2$ amine, 40 g of chloroform (ethanol-free) and 5.59 g (0.0706 eq) of pyridine. Once the reaction mixture was homogeneous, 20.2 g (0.0642 eq) of Empol™ 1008 dimer acid chloride and 20 g additional chloroform were added via an addition funnel. After a total reaction time of 2.5 hours, the oil bath temperature was raised to 80° C., and the reaction mixture was washed with 126 g of 2% aqueous sulfuric acid. The reaction mixture was then poured into a separatory funnel and the layers were allowed to separate. The lower organic layer was saved, was washed with 126 g of hot water, was allowed to separate, and was concentrated by stripping on a rotary evaporator set at 90° C. to give a yield of 52.0 g of a dark solid which was found to be the desired product by $^1$H and $^{13}$C NMR and thermogravimetric analysis.

Fluorochemical Amide F-45 was prepared by reacting EtFOS-NH$_2$ amine with stearoyl chloride at a 1:1 molar ratio using the following procedure. A 250 mL 3-necked round-bottom flask equipped with overhead stirrer and 120° C. oil bath was charged with 22.5 g (0.064 eq) of stearoyl chloride, followed by 40.0 g (0.64 eq) of molten EtFOS-NH$_2$ amine. The reaction mixture was allowed to react for about 6 hours, after which 58.3 g of solid was isolated, which was found to be the desired product by $^1$H and $^{13}$C NMR and thermogravimetric analysis.

Fluorochemical Amide F-46 was prepared using essentially the same procedure as described for preparing Fluorochemical Amide F-44, except that EtFOS-NHMe amine was substituted for EtFOS-NH$_2$ amine, and the molar ratio of amine to dichloride was 2:1.

Fluorochemical Amide F-47 was prepared using essentially the same procedure as described for preparing Fluorochemical Amide F-45, except that EtFOS-NHMe amine was substituted for EtFOS-NH$_2$ amine.

Fluorochemical Amide F-48 was prepared by reacting POSF sulfonyl fluoride with piperazine in a 2:1 molar ratio, using the procedure described in Example 7 of U.S. Pat. No. 5,451,622.

Fluorochemical Amide F-49 was prepared by reacting POSF sulfonyl fluoride, stearoyl chloride and piperazine in a 1:1:1 molar ratio, using the procedure described in Example 6 of U.S. Pat. No. 5,451,622.

Table 8 shows the various acid derivatives and amines used to make the amides and their approximate molar ratios.

TABLE 8

| Fluorochemical Amide | Amine | Acid Derivative | Molar Ratio of Amine to Acid Der. |
| --- | --- | --- | --- |
| F-44 | EtFOS—NH$_2$ | Empol ™ 1008 dichloride | 2:1 |
| F-45 | EtFOS—NH$_2$ | $C_{17}H_{35}COCl$ | 1:1 |
| F-46 | EtFOS—NHMe | Empol ™ 1008 dichloride | 1:2 |
| F-47 | EtFOS—NHMe | $C_{17}H_{35}COCl$ | 1:1 |
| F-48 | piperazine | POSF | 1:2 |
| F-49 | piperazine | POSF/$C_{17}H_{35}COCl$ | 1:2 |

Synthesis of Fluorochemical Oxazolidinones

Fluorochemical Oxazolidinone F-50 was prepared by reacting fluorochemical chlorohydrin $C_8F_{17}SO_2N(Me)CH(OH)CH_2Cl$ with stearyl isocyanate at a 1:1 molar ratio followed by ring closure using essentially the same procedure as described in Scheme I of U.S. Pat. No. 5,025,052 (Crater et al.).

Fluorochemical Oxazolidinone F-51 was prepared by reacting $C_8F_{17}SO_2N(Me)CH(OH)CH_2Cl$ with hexamethylene diisocyanate at a 2:1 molar ratio followed by ring closure using essentially the same procedure as described in Scheme I of U.S. Pat. No. 5,025,052 (Crater et al.).

Table 9 shows the various isocyanates and amines used and their approximate molar ratios.

TABLE 9

| Fluorochemical Oxazolidinone | Isocyanate | Molar Ratio of Chlorohydrin to Isocyanate |
| --- | --- | --- |
| F-50 | $C_{18}H_{37}NCO$ | 1:1 |
| F-51 | $OCN(CH_2)_6NCO$ | 2:1 |

Synthesis of Fluorochemical Amide Urea, Amic Acids

Fluorochemical amide urea F-52 was prepared by reacting POSF, piperazine and $C_{18}H_{37}NCO$ in a 1:1:1 molar ratio, using the procedure described in Example 2 of U.S. Pat. No. 5,451,622.

Fluorochemical amic acid F-53 was prepared using the following procedure. A 250 mL 3-necked flask equipped with overhead stirrer and placed in a 120° C. oil bath was charged with 22.51 g (0.064 eq) of octadecen-1-ylsuccinic anhydride (ODSA) followed by 40.0 g (0.064 eq) of molten $C_8F_{17}SO_2N(C_2H_5)C_2H_4NH_2$ (EtFOS-NH$_2$). After about 6 hours of reaction, 58.3 g of solid was isolated and was determined to be the desired amic acid product from $^1$H and $^{13}$C. NMR analysis.

Fluorochemical amic acid F-54 was prepared using the following procedure. A 250 mL 3-necked flask equipped with overhead stirrer was charged with 62.49 g (0.107 eq) of $C_8F_{17}SO_2N(C_2H_5)C_2H_4NHCH_3$ (EtFOS-NHMe), 37.51 g (0.107 eq) of octadecen-1-ylsuccinic anhydride (ODSA) and 0.187g of benzyltriethylammonium chloride. The contents of the flask were heated 75° C. for 3 days, followed by heating to 100° C. for an additional day. The reaction product was determined to be the desired amic acid product from $^1$H and $^{13}$C NMR analysis.

TABLE 10

| Fluorochemical | Base | Acid | Molar Ratio |
|---|---|---|---|
| F-52 | piperazine | POSF, $C_{18}H_{37}$NCO | 1:1:1 |
| F-53 | EtFOS—$NH_2$ | ODSA | 1:1 |
| F-54 | EtFOS—NHMe | ODSA | 1:1 |

EXAMPLES

Examples 1–25 and Comparative Examples C1–C30

In Examples 1–25 and Comparative Examples C1–C30, thermal stabilities of the various fluorochemicals listed in Table 1 through Table 10 (F-1 through F-54) were determined at 220° C., 280° C., 320° C. and 340° C. using the Thermogravimetric Analysis Test. The same fluorochemicals from Table 1 through Table 10 were then blended with Escorene™ PP3505 polypropylene chips at 1.00% (wt) solids, and the blends were thermally extruded into nonwoven webs using the Melt-Blown Extrusion Procedure. The nonwoven webs were evaluated for repellency using the Water Repellency Test and the Oil Repellency Test immediately, after 1–2 weeks at room temperature, and after the Embossing Procedure.

Results of these thermal resistance and repellency tests are shown in Table 11.

TABLE 11

| Ex. | Fluorochem. | TGA, % left at (° C.): 220 | 280 | 320 | 340 | Water Repellency: Init. | 1–2 w | Emb. | Oil Repellency: Init. | 1–2 w | Emb. |
|---|---|---|---|---|---|---|---|---|---|---|---|
| \multicolumn{12}{c}{PP3505 Alone (No Fluorochemical):} |
| C1 | — | — | — | — | — | 2 | 2 | 2 | 0 | 0 | 0 |
| \multicolumn{12}{c}{Fluorochemical Dimer/Trimer Acid Esters:} |
| 1 | F-1 | 97 | 96 | 94 | 93 | 8 | 8 | 9 | 2 | 1 | 3 |
| 2 | F-2 | 98 | 98 | 95 | 92 | 3 | N/R | 4 | 0 | N/R | 1 |
| 3 | F-3 | 97 | 95 | 94 | 92 | 8 | N/R | 9 | 2 | N/R | 4 |
| 4 | F-4 | 99 | 98 | 96 | 94 | 4 | N/R | 8 | 1 | N/R | 1 |
| 5 | F-5 | 98 | 96 | 94 | 90 | 5 | 4 | 4 | 0 | 0 | 0 |
| 6 | F-6 | 95 | 94 | 91 | 86 | 7 | 8 | 7 | 0 | 0 | 0 |
| 7 | F-7 | 97 | 96 | 94 | 93 | 8 | 6 | 9 | 0 | 0 | 0 |
| 8 | F-8 | 96 | 96 | 94 | 93 | 8 | 8 | 9 | 0 | 0 | 0 |
| 9 | F-9 | 98 | 96 | 90 | 82 | 6 | N/R | 9 | 0 | N/R | 2 |
| 10 | F-10 | 95 | 94 | 94 | 84 | 5 | N/R | 7 | 0 | N/R | 0 |
| 11 | F-11 | 96 | 95 | 94 | 91 | 8 | N/R | 9 | 0 | N/R | 2 |
| 12 | F-12 | 97 | 96 | 94 | 90 | 8 | N/R | 8 | 1 | N/R | 0 |
| 13 | F-13 | 99 | 98 | 95 | 91 | 3 | N/R | 4 | 0 | N/R | 0 |
| 14 | F-14 | 97 | 96 | 93 | 91 | 6 | N/R | 8 | 0 | N/R | 1 |
| 15 | F-15 | 99 | 97 | 94 | 89 | 3 | N/R | 4 | 0 | N/R | 0 |
| 16 | F-24 | 95 | 94 | 92 | 89 | 8 | 8 | 8 | 2 | 1 | 3 |
| 17 | F-25 | 95 | 94 | 92 | 89 | 8 | 7 | 9 | 2 | 0 | 3 |
| 18 | F-23 | 100 | 99 | 95 | 88 | 6 | N/R | 7 | 0 | N/R | 0 |
| \multicolumn{12}{c}{Fluorochemical Esters (Not Based on Dimer/Trimer Acids)} |
| 19 | F-16 | 98 | 95 | 85 | 72 | 5 | N/R | 8 | 1 | N/R | 2 |
| 20 | F-17 | 87 | 84 | 62 | 42 | 6 | N/R | 6 | 1 | N/R | 1 |
| C2 | F-18 | 95 | 82 | 42 | 5 | 5 | N/R | 8 | 0 | N/R | 2 |
| 21 | F-19 | 96 | 90 | 70 | 47 | 5 | N/R | 7 | 1 | N/R | 1 |
| C3 | F-20 | 91 | 50 | 1 | 1 | 5 | N/R | 8 | 1 | N/R | 1 |
| 22 | F-21 | 98 | 89 | 65 | 34 | 4 | N/R | 5 | 1 | N/R | 0 |
| C4 | F-22 | 89 | 36 | 1 | 0 | 5 | N/R | 5 | 1 | N/R | 1 |
| 23 | F-26 | 85 | 68 | 24 | 4 | 4 | N/R | 9 | 0 | N/R | 3 |
| C5[1] | F-27 | 92 | 49 | 10 | 1 | 3 | 9 | 8 | 0 | 1 | 0 |
| \multicolumn{12}{c}{Fluorochemical Ester Alcohols:} |
| C6 | F-28 | 92 | 85 | 80 | 76 | 4 | N/R | 5 | 1 | N/R | 1 |
| C7 | F-29 | 93 | 86 | 82 | N/R | 5 | N/R | 4 | 0 | N/R | 0 |
| C8 | F-30 | 87 | 73 | 62 | 52 | 2 | N/R | N/R | 0 | N/R | N/R |
| C9 | F-31 | 90 | 78 | 52 | 26 | 5 | N/R | 7 | 0 | N/R | 4 |
| \multicolumn{12}{c}{Fluorochemical Ether Alcohols:} |
| C10 | F-32 | 96 | 92 | 85 | 78 | 3 | N/R | 3 | 1 | N/R | 0 |
| C11 | F-33 | 92 | 80 | 53 | 28 | 7 | N/R | N/R | 1 | N/R | N/R |
| \multicolumn{12}{c}{Fluorochemical Amino Alcohols:} |
| C12 | F-34 | 92 | 81 | 63 | 47 | 5 | N/R | 5 | 0 | N/R | 1 |
| C13 | F-35 | 90 | 80 | 72 | 56 | 4 | N/R | 4 | 0 | N/R | 1 |
| C14[2] | F-36 | 92 | 80 | 51 | 30 | 6 | N/R | 7 | 1 | N/R | 1 |
| \multicolumn{12}{c}{Fluorochemical Urethanes:} |
| C15 | F-37 | 97 | 91 | 84 | 78 | 2 | N/R | 3 | 0 | N/R | 0 |
| C16 | F-38 | 96 | 92 | 75 | 57 | 2 | N/R | 3 | 0 | N/R | 0 |
| C17 | F-39 | 92 | 78 | 39 | 23 | 5 | N/R | N/R | 0 | N/R | N/R |

TABLE 11-continued

| Ex. | Fluoro-chem. | TGA, % left at (° C.): | | | | Water Repellency: | | | Oil Repellency: | | |
|---|---|---|---|---|---|---|---|---|---|---|---|
| | | 220 | 280 | 320 | 340 | Init. | 1–2 w | Emb. | Init. | 1–2 w | Emb. |
| C18 | F-40 | 93 | 48 | 2 | 1 | 3 | N/R | N/R | 0 | N/R | N/R |
| | | | | Fluorochemical Ureas: | | | | | | | |
| C19 | F-41 | 94 | 77 | 43 | 25 | 2 | N/R | 4 | 1 | N/R | 1 |
| C20 | F-42 | 93 | 69 | 39 | 22 | 2 | N/R | N/R | 0 | N/R | N/R |
| C21 | F-43 | 97 | 68 | 29 | 17 | 3 | N/R | N/R | 0 | N/R | N/R |
| | | | | Fluorochemical Amides: | | | | | | | |
| 24 | F-44 | 97 | 95 | 89 | 80 | 6 | N/R | N/R | 1 | N/R | N/R |
| 24A | F-45 | 96 | 90 | 66 | 37 | 6 | N/R | 7 | 3 | N/R | 1 |
| 25 | F-46 | 97 | 93 | 86 | 83 | 4 | N/R | N/R | 0 | N/R | N/R |
| 25A | F-47 | 97 | 87 | 56 | 21 | 0 | N/R | N/R | 2 | N/R | N/R |
| C24 | F-48 | 95 | 73 | 59 | 53 | 1 | N/R | N/R | 0 | N/R | N/R |
| C25[3] | F-49 | 99 | 90 | 62 | 32 | 9 | N/R | 10 | 2 | N/R | 5 |
| | | | | Fluorochemical Oxazolidinones: | | | | | | | |
| C26[4] | F-50 | 96 | 86 | 65 | 45 | 9 | 10 | 10 | 2 | 3 | 5 |
| C27[4] | F-51 | 99 | 98 | 93 | 84 | 3 | 3 | 2 | 0 | 0 | 0 |
| | | | | Fluorochemicals with Mixed Functional Groups: | | | | | | | |
| C28 | F-52 | 96 | 49 | 11 | 1 | 2 | N/R | N/R | 0 | N/R | N/R |
| C29 | F-53 | 93 | 89 | 78 | 64 | 5 | N/R | 5 | 0 | N/R | 0 |
| C30 | F-54 | 96 | 83 | 66 | 50 | 2 | N/R | N/R | 0 | N/R | N/R |

N/R: Experiment was not run
[1]Fluorochemical melt additive described in U.S. Pat. No. 5,459,188
[2]Fluorochemical melt additive described in U.S. Pat. No. 5,380,778
[3]Fluorochemical melt additive described in U.S. Pat. No. 5,451,622
[4]Fluorochemical melt additive described in U.S. Pat. No. 5,025,052

The data in Table 11 show that the fluorochemical esters derived from fluorochemical sulfonamido alcohols or acids and all carboxylic acids or alcohols, respectively (Examples 1–4, 7–9, 11, 14, 16, 17, 19, 21 and 23–26), the fluorochemical esters derived from fluorochemical telomer alcohols and dimer/trimer acids (Examples 5, 6, 10, 12, 13, and 15) and fluorochemical amides derived from fluorochemical amines and dimer acids (Examples 24, 24A, 25, and 25A) each exhibited a balance of good to excellent thermal stability and good repellency when blended with the polypropylene resin. Among fluorochemical esters not based on dimer/trimer acids, those having sulfonamide groups (Examples 19, 21, 22, and 23) exhibit better thermal stability than those corresponding materials not containing sulfonamide groups (Comparative Examples C2, C3, C4, and C5).

Additionally, the data show that for the pairs of fluorochemical esters of Examples 1 and 2, 3 and 4, and 12 and 13, which differ in that the first member of each pair contains statistically two fluorochemical esters per molecule while the second member contains statistically one fluorochemical ester per molecule, that the member containing two esters per molecule imparts better oil and water repellency than the member containing one ester per molecule.

Examples 26–37 and Comparative Examples C31–C40

In Examples 26–37, fluorochemical dimer acid ester F-1 was blended with various thermoplastic polymers at 1.00% (wt) solids, and the blends were thermally extruded into nonwoven webs using the Melt-Blown Extrusion Procedure. The nonwoven webs were evaluated for repellency using the Water Repellency Test and the Oil Repellency Test immediately, after 1–2 weeks at room temperature, and after embossing.

In Comparative Examples C31–C40, the same experiments were run as described in Examples 26–37 respectively except that no fluorochemical melt additive was blended with the thermoplastic resins.

Results from the evaluations of Examples 26–37 and Comparative Examples C31–C40 are presented in Table 12.

TABLE 12

| Ex. | Fluoro-chemical: | | Water Repellency: | | | Oil Repellency: | | |
|---|---|---|---|---|---|---|---|---|
| | Name | % (wt) | Init. | 1–2 w | Emb. | Init. | 1–2 w | Emb. |
| | | Escorene™ PP3505 Polypropylene: | | | | | | |
| 26 | F-1 | 1.00 | 8 | 8 | 9 | 2 | 1 | 2 |
| C31 | — | — | 2 | 2 | 2 | 1 | 0 | 0 |
| | | Aspun™ 6806 Polyethylene: | | | | | | |
| 27 | F-1 | 1.00 | 9 | 9 | 9 | 2–3 | 1 | 2 |
| C32 | — | — | 2 | 2 | 2 | 0 | 0 | 0 |
| | | Morthane™ PS 400 Polyurethane: | | | | | | |
| 28 | F-1 | 1.00 | 7 | 8 | 8 | 4 | 5 | 6 |
| C33 | — | — | 2 | 2 | 3 | 0 | 0 | 0 |
| | | Celanex™ 2002 Polybutylene Terephthalate: | | | | | | |
| 29 | F-1 | 1.00 | 3 | 4 | 4 | 1 | 2 | 2 |
| C34 | — | — | 2 | 2 | 2 | 0 | 0 | 0 |
| | | PET 35 Polyethylene Terephthalate: | | | | | | |
| 30 | F-1 | 1.00 | 2 | 2 | 2 | 0 | 0 | 0 |
| 31 | F-1 | 1.50 | 2 | 2 | 2 | 0 | 0 | 0 |
| C35 | — | — | 1 | 1 | 1 | 0 | 0 | 0 |
| | | BASF Ultramid™ B3 Nylon: | | | | | | |
| 32 | F-1 | 1.00 | 1 | 1 | 1 | 0 | 0 | 0 |
| 33 | F-1 | 1.50 | 1 | 1 | 1 | 0 | 0 | 0 |
| C36 | — | — | 0 | 0 | 0 | 0 | 0 | 0 |
| | | Engage™ 8400 Poly (Eth/Oct): | | | | | | |
| 34 | F-1 | 1.00 | 9 | N/R | N/R | 4 | N/R | N/R |
| C37 | — | 1.00 | 2 | N/R | N/R | 0 | N/R | N/R |

TABLE 12-continued

| Ex. | Fluoro-chemical: Name | % (wt) | Water Repellency: Init. | 1–2 w | Emb. | Oil Repellency: Init. | 1–2 w | Emb. |
|---|---|---|---|---|---|---|---|---|
| Exact™ 4023 Poly (Eth/But): | | | | | | | | |
| 35 | F-1 | 1.00 | 9 | N/R | N/R | 3 | N/R | N/R |
| C38 | — | 1.00 | 5 | N/R | N/R | 0 | N/R | N/R |
| Rexene™ D-100 Polypropylene: | | | | | | | | |
| 36 | F-1 | 1.00 | 9 | N/R | N/R | 3 | N/R | N/R |
| C39 | — | 1.00 | 3 | N/R | N/R | 0 | N/R | N/R |
| 90% Rexene™ D-100 Polypropylene + 10% 3795 Polypropylene: | | | | | | | | |
| 37 | F-1 | 1.00 | 9 | N/R | N/R | 4 | N/R | N/R |
| C40 | — | 1.00 | 3 | N/R | N/R | 0 | N/R | N/R |

N/R: Experiment was not run

The data in Table 12 show that fluorochemical dimer acid ester F-1 improves the oil and water repellency of all the thermoplastic polymers evaluated as melt blown constructions, though the improvement for the PET 35 polyethylene terephthalate and the BASF Ultramid™ B-3 nylon were not as dramatic.

Examples 38–46 and Comparative Examples C41–C42

In Examples 38–46, fluorochemical dimer acid ester F-1 was blended with Escorene™ PP3505 polypropylene chips at weight percent solids varying from 0.50–1.25%, and the blends were thermally extruded into nonwoven webs at various basis weights using the Spunbond Extrusion Procedure. The nonwoven webs were evaluated for repellency using the Water Repellency Test and the Oil Repellency Test after time periods of 5 minutes, 2 hours (120 min) and 17–22 hours (reported as 1320 min) at ambient temperature after web formation.

In Comparative Examples C41–C42, the same experiment was run as described in Examples 38–46, except that no fluorochemical melt additive was blended with the polypropylene resin and two basis weights were run.

Results from the evaluations of Examples 37–45 and Comparative Examples C41–C42 are presented in Table 13.

TABLE 13

| Ex. | Fluoro-chemical: Name | % (wt) | Bas. Wt., (g/m²) | Water Repel. (mm): 5 | 120 | 1320 | Oil Repel. (min): 5 | 120 | 1320 |
|---|---|---|---|---|---|---|---|---|---|
| 38 | F-1 | 0.50 | 19.5 | 3 | 4 | 2 | 0 | 0 | 0 |
| 39 | F-1 | 0.75 | 20.1 | 5 | 4 | 4 | 0 | 0 | 0 |
| 40 | F-1 | 1.00 | 20.1 | 7 | 6 | 7 | 0 | 0 | 0 |
| 41 | F-1 | 1.25 | 19.5 | 7 | 6 | 7 | 0 | 0 | 0 |
| 42 | F-1 | 1.00 | 49.2 | 8 | 8 | N/R | 2 | 1 | N/R |
| 43 | F-1 | 1.25 | 49.9 | 7 | N/R | 7 | 0 | N/R | 0 |
| 44 | F-1 | 1.00 | 98.6 | 7 | N/R | 6 | 1 | N/R | 0 |
| 45 | F-1 | 1.25 | 96.8 | 7 | N/R | 7 | 2 | N/R | 2 |
| 46 | F-1 | 1.50 | 177.7 | 8 | 8 | 9 | 3 | 3 | 3 |
| C41 | — | — | 19.5 | 2 | N/R | 2 | 0 | N/R | 0 |
| C42 | — | — | 98.3 | 1 | N/R | 1 | 0 | N/R | 0 |

The data in Table 13 show that fluorochemical dimer acid ester F-1 imparted excellent water repellency to all of the polypropylene spunbonded webs at all concentrations and basis weights evaluated. Good oil repellency was achieved at higher F-1 concentrations.

Examples 47–50 and Comparative Examples C43–C46

In Examples 47–50 and Comparative Examples C43–46, fluorochemical dimer acid ester F-1 was evaluated for weight loss using the Thermogravimetric Analysis Test as in Example 1, except this time the test was run under isothermal conditions (at 220, 250, 280 or 320° C.) and the amount of F-1 left was measured after time periods of 5, 20 and 60 minutes.

In Comparative Examples C43–C46, the same experiments were run as in Examples 47–50, except that fluorochemical oxazolidinone F-50 was substituted for Fluorochemical Ester F-1.

Results of these weight loss evaluations are presented in Table 14.

TABLE 14

| Ex. | Fluoro-chemical | Temp. (° C.) | % Fluorochemical Left After (min): 5 | 20 | 60 |
|---|---|---|---|---|---|
| 47 | F-1 | 220 | 96 | 94 | 92 |
| C43 | F-50 | 220 | 96 | 91 | 86 |
| 48 | F-1 | 250 | 95 | 92 | 89 |
| C44 | F-50 | 250 | 93 | 82 | 71 |
| 49 | F-1 | 280 | 93 | 85 | 74 |
| C45 | F-50 | 280 | 88 | 66 | 35 |
| 50 | F-1 | 320 | 89 | 69 | 41 |
| C46 | F-50 | 320 | 73 | 10 | N/R |

N/R: Experiment was not run

The data in Table 14 show that at every temperature run, fluorochemical ester F-1 exhibited superior thermal stability to fluorochemical oxazolidinone F-50.

Example 51 and Comparative Example C47

Films were made from spunbond polypropylene nonwoven webs with and without fluorochemical dimer acid ester. These films were evaluated for oil and water repellency.

In Example 51, a film was pressed from spunbond Escorene™ PP3505 polypropylene containing 1.25% of fluorochemical dimer acid ester F-1 (from Example 45 of Table 13) using the following procedure. A sandwich construction was assembled consisting of a rectangular steel plate of 25.4 cm length and 15.3 cm width, a copper foil of dimensions similar to those of the steel plate, and a rectangular steel shim of 25.4 cm length, 15.3 cm width and 254 1 thickness in which a centered rectangular cutout of 10.1 cm by 8.7 cm was made. Next, 2.5 g of spunbond polypropylene was folded into the center of the cutout area with approximate open margin border of approximately 1 cm on each side. The fabric was covered with more copper foil and another rectangular steel plate of the same dimensions used in the rest of the construction. Next, the sandwich construction was placed between the plates of a press, each plate being heated to 200° C., and the plates were brought together with a force of 5 tons for a 4 inch (10.2 cm) diameter circle (587,000 kg/m²) for 2 minutes. Afterwards, the sandwich construction was removed from the heated plates and was placed between two unheated plates on the press at a much lower pressure to cool for 1 minute. The construction was disassembled, the film was extracted. The film was then evaluated for repellency using the Water Repellency Test and the Oil Repellency Test; the same test liquids and rating scale were used as with the nonwoven web repellency test, with the reported value corresponding to the highest number test liquid for which a drop, when placed on the surface of the film, would not spread.

In Comparative Example C47, the same polypropylene film preparation and evaluation was run as described in Example 51, except that the fluorochemical dimer acid ester F-1 was omitted.

Results from Example 51 and Comparative Example C47 are presented in Table 15.

TABLE 15

| Ex. | Composition of Film | Thickness, mils (μ) | Water Repellency | Oil Repellency |
|---|---|---|---|---|
| 51 | PP 3445 + 1.25% F-1 | 11.2 (280) | 9 | 1 |
| C47 | PP 3445 only | 10.2 (255) | 4 | 0 |

The data in Table 15 show that the film made from polypropylene having fluorochemical dimer acid ester F-1 added thereto exhibited improved water and oil repellency relative to the film made from polypropylene only.

Example 52 and Comparative Example C48

Molded castings were made from a two-part, room temperature-curable, thermoset epoxy resin system (3M Scotch-Weld™ 2158 B/A Epoxy Adhesive Tube Kit) with and without fluorochemical dimer acid ester. After curing, the castings were evaluated for water and oil repellency.

In Example 52, 2.45 g of Part A, 2.45 g of Part B and 0.10 g of fluorochemical dimer acid ester F-1 were mixed together in an approximately 60 mm diameter aluminum weighing pan. The sample was cured for 1 hour at 80° C. and was left overnight at room temperature. The Water Repellency Test and the Oil Repellency Test were then run on the surface of the cured casting; the same test liquids and rating scale were used as with the nonwoven web repellency test, with the reported value corresponding to the highest number test liquid for which a drop, when placed on the surface of the film, would not spread.

In Comparative Example C48, the same epoxy resin preparation and evaluation was run as described in Example 52, except that the fluorochemical dimer acid ester F-1 was omitted.

Results are presented in Table 16.

TABLE 16

| Ex. | Composition of Epoxy Casting | Water Repellency | Oil Repellency |
|---|---|---|---|
| 52 | 2158 + 1.25% F-1 | 10 | 7 |
| C48 | 2158 only | 2 | 1 |

The data in Table 16 show that the casting made from epoxy resin having fluorochemical dimer acid ester F-1 added thereto exhibited dramatically improved water and oil repellency relative to the casting made from epoxy resin only.

Examples 53–54 and Comparative Example C49–C50

Molded castings were made from a one-part, moisture-curable, thermoset polyurethane resin system (found in 3M EC-5200 Marine Adhesive Sealant) with and without fluorochemical dimer acid ester. After curing, the castings were evaluated for water and oil repellency.

9.8 g of EC-5200 sealant and 0.2 g of fluorochemical dimer acid ester F-1 were mixed together in a vial, and the mixture was heated with a heat gun and stirred until a homogeneous mixture resulted. Equal portions were then poured into two approximately 60 mm diameter aluminum weighing pans. For Example 53, the resin system in the first pan was allowed to cure overnight under ambient conditions (roughly 50 % relative humidity). For Example 54, the resin system in the second pan was baked for 15 hours at 50° C. above a pan of water. The Water Repellency Test and the Oil Repellency Test were then run on the surface of each cured resin; the same test liquids and rating scale were used as with the nonwoven web repellency test, with the reported value corresponding to the highest number test liquid for which a drop, when placed on the surface of the film, would not spread.

In Comparative Examples C49–C50, the same moisture-cured polyurethane resin preparation and evaluation was run as described in Example 53–54, respectively, except that the fluorochemical dimer acid ester F-1 was omitted.

Results are presented in Table 17.

TABLE 17

| Ex. | Composition of Epoxy Casting | Ambient or Bake | Water Repellency | Oil Repellency |
|---|---|---|---|---|
| 53 | 5200 + 1.25% F-1 | Ambient | 10 | 8 |
| C49 | 5200 only | Ambient | 3 | 1 |
| 54 | 5200 + 1.25% F-1 | Bake | 10 | 7 |
| C50 | 5200 only | Bake | 3 | 0 |

The data in Table 17 show that the casting made from moisture-cured polyurethane resin having fluorochemical dimer acid ester F-1 added thereto exhibited dramatically improved water and oil repellency to the casting made from moisture-cured polyurethane resin only, cured either under ambient conditions or baked.

Various modifications and alterations of this invention will be apparent to those skilled in the art without departing from the scope and spirit of this invention, and it should be understood that this invention is not limited to the illustrative embodiments set forth herein.

We claim:

1. A hydrophobic and oleophobic fiber comprising a composition prepared by forming a blend comprising synthetic organic polymer and one or more fluorochemicals selected from the group consisting of compounds depicted by the formulas:

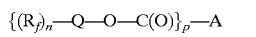

$\{(R_f)_n\text{—Q—O—C(O)}\}_p\text{—A}$

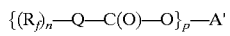

$\{(R_f)_n\text{—Q—C(O)—O}\}_p\text{—A'}$

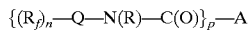

$\{(R_f)_n\text{—Q—N(R)—C(O)}\}_p\text{—A}$

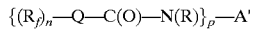

$\{(R_f)_n\text{—Q—C(O)—N(R)}\}_p\text{—A'}$ wherein:
$R_f$ is a fluorinated alkyl group bonded through carbon;
n is 1 or 2;
Q is a divalent or trivalent linking group or a covalent bond;
p is 2 or more, up to the valency of A or A';
R is a hydrogen atom or is a substituted or unsubstituted alkyl group;
A is the residue of a dimer or trimer acid; and
A' is the residue of a dimer diol, a dimer diamine, a trimer triol, or a trimer triamine.

2. The fiber of claim 1 wherein said synthetic organic polymer is thermoplastic.

3. The fiber of claim 1 wherein said synthetic organic polymer is thermoset.

4. The fiber of claim 2 wherein said thermoplastic polymer is a polyamide, polyester, or a polyolefin.

5. The fiber of claim 1 having a fluorine content in the range from about 100 to 20,000 ppm based on the weight of the fiber.

6. The fiber of claim 1 wherein said fiber is a blown microfiber.

7. A fabric comprising the blown microfiber of claim 6.

8. The fiber of claim 1 wherein said fiber is spunbond.

9. A fabric of comprising the spunbond fiber of claim 8.

10. A fabric comprising the fiber of claim 1.

11. A multilayer article comprising a first layer composed of spunbond fabric, a second layer composed of meltblown fabric, and a third layer composed of spunbond fabric wherein at least one of said layers comprises the fiber of claim 1.

12. The fabric of claim 10 wherein the fabric comprises a nonwoven web.

13. The fiber of claim 1 wherein said fluorochemicals are selected from the group consisting of compounds depicted by the formulas:

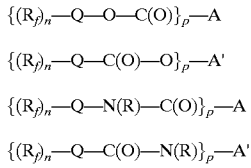

wherein:

$R_f$ is a substituted or unsubstituted, cyclic or acyclic, linear or branched (or any combination thereof) fluorinated alkyl group bonded through carbon that can optionally contain one or more catenary heteroatoms; $R_f$ can contain one or more hydrogen atoms or one or more halogen atoms other than fluorine atoms, provided that at least 75% of the atoms attached to the carbon backbone are fluorine atoms;

n is 1 or 2;

Q is a divalent or trivalent organic linking group that contains from 1 to about 20 atoms and that optionally can contain oxygen-, nitrogen- or sulfur-containing groups or any combination thereof;

p is 2 or more, up to the valency of A or A';

R is a hydrogen atom or is a substituted or unsubstituted alkyl group;

A is the residue of a dimer or trimer acid, representing an aliphatic moiety containing from about 30 to 170 carbon atoms; and A' is the residue of a dimer diol, a dimer diamine, a trimer triol, or a trimer triamine, said residue representing an aliphatic moiety containing from about 30 to 170 carbon atoms.

14. The fiber of claim 13 wherein said Q is selected from the group consisting of —SO$_2$N(R')(CH$_2$)$_k$—, —(CH$_2$)$_k$—, —CON(R')(CH$_2$)$_k$— and —(CH$_2$)$_k$SO$_2$N(R')(CH$_2$)$_k$—, where R' is hydrogen, a phenyl group or is a methyl or ethyl group and where each k is independently an integer from 1 to about 20.

15. The fiber of claim 13 wherein said p is nearly equal to the valency of A or A'.

16. A fabric comprising the fiber of claim 13.

17. The fiber of claim 1 wherein said A is the residue of a dimer acid and said A' is the residue of a dimer diol or a dimer diamine.

18. A hydrophobic and oleophobic fiber comprising a composition prepared by forming a blend comprising synthetic organic polymer and one or more fluorochemicals selected from the group consisting of compounds depicted by the formulas:

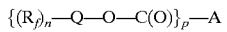

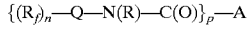

wherein:

$R_f$ is a substituted or unsubstituted, cyclic or acyclic, linear or branched (or any combination thereof) fluorinated alkyl group bonded through carbon that can optionally contain one or more catenary heteroatoms; $R_f$ can contain one or more hydrogen atoms or one or more halogen atoms other than fluorine atoms, provided that at least 75% of the atoms attached to the carbon backbone are fluorine atoms;

n is 1 or 2;

Q is selected from the group consisting of —SO$_2$N(R')(CH$_2$)$_k$—, —(CH$_2$)$_k$—, CON(R')(CH$_2$)$_k$— and —(CH$_2$)$_k$SO$_2$N(R')(CH$_2$)$_k$—, where R' is hydrogen, a phenyl group or is a methyl or ethyl group and where each k is independently an integer from 1 to about 20;

p is 2 or more, up to the valency of A;

R is a hydrogen atom or is a substituted or unsubstituted alkyl group; and

A is the residue of a dimer acid, representing an aliphatic moiety containing from about 30 to 170 carbon atoms.

19. A fabric comprising the fiber of claim 18.

20. Filter media comprising the fabric of claim 10.

21. Filter media comprising the fabric of claim 19.

* * * * *